US012011733B2

(12) United States Patent
Zhu et al.

(10) Patent No.: US 12,011,733 B2
(45) Date of Patent: Jun. 18, 2024

(54) ELECTRIC CHARGES IN CHEMICAL SOLUTION OF ELECTROSTATIC SPRAYER

(71) Applicant: NINGBO KEPO ELECTRONICS CO., LTD., Ningbo (CN)

(72) Inventors: Shaoxu Zhu, Ningbo (CN); Yongdu Min, Ningbo (CN)

(73) Assignee: NINGBO KEPO ELECTRONICS CO., LTD., Ningbo (CN)

( * ) Notice: Subject to any disclaimer, the term of this patent is extended or adjusted under 35 U.S.C. 154(b) by 312 days.

(21) Appl. No.: 17/668,269

(22) Filed: Feb. 9, 2022

(65) Prior Publication Data

US 2022/0266272 A1 Aug. 25, 2022

(30) Foreign Application Priority Data

Feb. 9, 2021 (CN) ........................ 202110173780.X

(51) Int. Cl.
*B05B 5/053* (2006.01)
*B03C 3/38* (2006.01)
(Continued)

(52) U.S. Cl.
CPC .............. *B05B 5/0533* (2013.01); *B03C 3/38* (2013.01); *B05B 5/0255* (2013.01); *B05B 5/16* (2013.01); *B05B 12/002* (2013.01); *B05B 15/40* (2018.02)

(58) Field of Classification Search
CPC ....... B03C 3/38; B05B 5/0533; B05B 5/0255; B05B 5/16; B05B 12/002; B05B 15/40
See application file for complete search history.

(56) References Cited

U.S. PATENT DOCUMENTS 10,926,275 B1 * 2/2021 Kinne .................. B05B 5/1691
2014/0312149 A1 * 10/2014 Hasselschwert ...... B05B 5/0255 239/690

(Continued)

*Primary Examiner* — Jue Zhang
*Assistant Examiner* — Lakaisha Jackson
(74) *Attorney, Agent, or Firm* — Jiwen Chen; Joywin IP Law PLLC

(57) ABSTRACT

The present invention relates to a method and device for increasing the quantity of electric charges in a chemical solution of an electrostatic sprayer. The method uses a liquid storage cavity of the electrostatic sprayer and an electrostatic module for generating static electricity. The liquid storage cavity is divided into a charging cavity and a chemical solution supply cavity. The charging cavity is isolated from the chemical solution supply cavity. An electrostatic output electrode of the electrostatic module applies static electricity to a chemical solution in the charging cavity in a static state so that the chemical solution carries a high content of electric charges. After the chemical solution carried with a high content of electric charges is sprayed out, the chemical solution in the chemical solution supply cavity is supplied into the charging cavity, so that the sprayed chemical solution is allowed to carry a high content of electric charges by charging static electricity to a small amount of the chemical solution in a stepped manner. In the method and device for increasing the quantity of electric charges in a chemical is solution of an electrostatic sprayer provided by the present invention, without changing the capacity, the quantity of electric charges in a part of the chemical solution in the liquid storage cavity is increased, the quantity of electric charges in the sprayed chemical solution is thus increased, and the absorption effect of the chemical solution is improved.

5 Claims, 4 Drawing Sheets

(51) Int. Cl.

| | |
|---|---|
| ***B05B 5/025*** | (2006.01) |
| ***B05B 5/16*** | (2006.01) |
| ***B05B 12/00*** | (2018.01) |
| ***B05B 15/40*** | (2018.01) |

(56) References Cited

U.S. PATENT DOCUMENTS

2022/0016650 A1* 1/2022 Smith ..................... B05B 5/005
2022/0111407 A1* 4/2022 Shen ..................... B05B 5/0537
2022/0152634 A1* 5/2022 Moylan ................. B05B 5/1691

* cited by examiner

ELECTRIC CHARGES IN CHEMICAL SOLUTION OF ELECTROSTATIC SPRAYER

This application claims priority to Chinese Patent Application No. 202110173780X filed Feb. 9, 2021, all of which are hereby incorporated by reference.

TECHNICAL FIELD OF THE INVENTION

The present invention relates to a method and device for increasing the quantity of electric charges in a chemical solution of an electrostatic sprayer.

BACKGROUND TECHNOLOGY

In the prior art, for example, the Chinese Invention Patent CN106687218B disclosed an electrostatic fluid delivery system, which delivers a fluid, such as a disinfectant fluid, onto a surface by electrically charging the fluid and forming the fluid into a mist, fog, plume or spray that can be directed onto a surface, such as a surface to be cleaned. The system atomizes the fluid using a high-pressure fluid stream and passes the fluid through an electrode of a nozzle assembly to charge droplets of the atomized fluid. However, in this electrostatic fluid delivery system, the chemical solution has less charges and poor in adsorption effect, and wastes a large space.

SUMMARY OF THE INVENTION

An object of the present invention is to provide a method and device for increasing the quantity of electric charges in a chemical solution of an electrostatic sprayer in order to solve the deficiencies of the above technologies.

The present invention provides a method for increasing the quantity of electric charges in a chemical solution of an electrostatic sprayer, which uses a liquid storage cavity of the electrostatic sprayer and an electrostatic module for generating static electricity, wherein the liquid storage cavity is divided into a charging cavity and a chemical solution supply cavity; wherein the charging cavity is isolated from the chemical solution supply cavity; an electrostatic output electrode of the electrostatic module applies static electricity to a chemical solution in the charging cavity in a static state so that the chemical solution carries a high content of electric charges; after the chemical solution carried with a high content of electric charges is sprayed out, the chemical solution in the chemical solution supply cavity is supplied into the charging cavity, so that the sprayed chemical solution is allowed to carry a high content of electric charges by charging static electricity to a small amount of the chemical solution in a stepped manner.

Using the above method, the present invention provides a device for increasing the quantity of electric charges in a chemical solution of an electrostatic sprayer, comprising a shell, a liquid storage cavity, an electrostatic module and a battery, wherein an insulating partition portion is arranged in the liquid storage cavity; the insulating partition portion divides the liquid storage cavity into a charging cavity and a chemical solution supply solution; a water pipe and a ground strap are arranged on the shell; the water pipe is connected to the charging cavity in the liquid storage cavity; the electrostatic module is arranged in the shell; the electrostatic module includes an electrostatic generator, a first electrode and a second electrode; the first electrode is connected to the charging cavity in the liquid storage cavity; the second electrode is connected to the ground strap; and, the battery is connected to the electrostatic generator.

To facilitate the chemical solution in the chemical solution supply cavity to enter the charging cavity, the insulating partition portion comprises a knob, a solution filtrate plate and a baffle; wherein the knob is arranged on the liquid storage cavity; liquid filter holes are formed on the liquid filter plate; the baffle is arranged on one side of the liquid filter plate and attached to the liquid filter plate; and, one end of the baffle is connected to the knob.

To make the connection between the first electrode and the charging cavity more reliable, a buckle fixed to the shell is arranged on the liquid storage cavity; a conductive piece is arranged in the buckle; the conductive piece is connected to the charging cavity in the liquid storage cavity; a contact piece in contact with the conductive piece is arranged on the shell; and, the contact piece is connected to the first electrode.

To make the contact between the conductive piece and the contact piece firmer, a spring is arranged in rear of the contact piece.

The method and device for increasing the quantity of electric charges in a chemical solution of an electrostatic sprayer provided by the present invention has the following advantages. Without changing the capacity, the quantity of electric charges in a part of the chemical solution in the liquid storage cavity is increased, the quantity of electric charges in the sprayed chemical solution is thus increased, and the absorption effect of the chemical solution is improved.

in which:

1: shell; 2: liquid storage cavity 2; 3: electrostatic module 3; 4: battery; 5: insulating partition portion; 6: charging cavity; 7: chemical solution supply cavity; 8: water pipe; 9: ground strap; 10: electrostatic generator; 11: first electrode; 12: second electrode; 13: knob; 14: liquid filter plate; 15: baffle; 16: liquid filter holes; 17: buckle; 18: conductive piece; 19: contact piece; 20: spring; 21: bump; 22: nozzle; and, 23: switch.

DETAILED DESCRIPTION OF THE EMBODIMENTS OF THE INVENTION

To further explain the technical means used to achieve the intended inventive objective and the effects thereof in the present invention, the specific implementations, structures, features and effects of the present invention will be described below in detail by preferred embodiments with reference to the accompanying drawings.

Embodiment 1

This embodiment provides a method for increasing the quantity of electric charges in a chemical solution of an electrostatic sprayer, which uses a liquid storage cavity of the electrostatic sprayer and an electrostatic module for generating static electricity, wherein the liquid storage cavity is divided into a charging cavity and a chemical solution supply cavity; the charging cavity is isolated from the chemical solution supply cavity; an electrostatic output electrode of the electrostatic module applies static electricity to a chemical solution in the charging cavity in a static state so that the chemical solution carries a high content of electric charges; after the chemical solution carried with a high content of electric charges is sprayed out, the chemical solution in the chemical solution supply cavity is supplied into the charging cavity, so that the sprayed chemical solution is allowed to carry a high content of electric charges by charging static electricity to a small amount of the chemical solution in a stepped manner.

Figure 1:
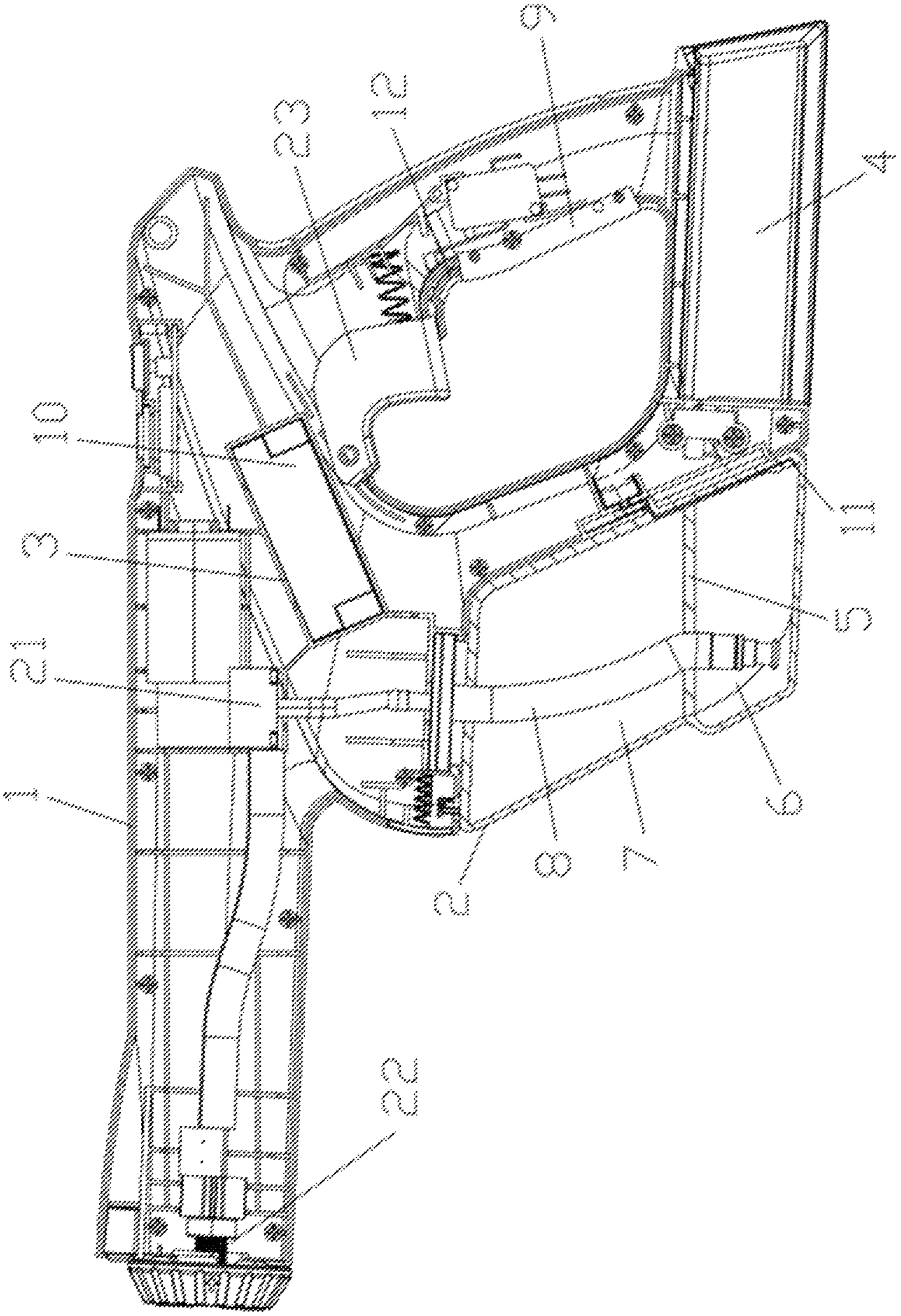
FIG. 1 is a schematic structure diagram of Embodiment 2 of the present invention.

During the implementation of the above-described method, this embodiment provides a device for increasing the quantity of electric charges in a chemical solution of an electrostatic sprayer, comprising a shell 1, a liquid storage cavity 2, an electrostatic module 3 and a battery 4. Here, the liquid storage cavity 2 is the liquid storage camber 2 in the above-described method. As shown in FIG. 1, an insulating partition portion 5 is arranged in the liquid storage cavity 2, and the insulating partition portion 5 divides the liquid storage cavity into a charging cavity 6 and a chemical solution supply solution 7. A water pipe 8 and a ground strap 9 are arranged on the shell 1. The water pipe 8 is connected to the charging cavity 6 in the liquid storage cavity 2. The electrostatic module 3 is arranged in the shell 1. The electrostatic module 3 includes an electrostatic generator 10, a first electrode 11 and a second electrode 12. The first electrode 11 is connected to the charging cavity 6 in the liquid storage cavity 2, the second electrode 12 is connected to the ground strap 9, and the battery 4 is connected to the electrostatic generator 10. The battery 4 is also connected to a pump 21, and the pump 21 is connected to the nozzle 22 and the water pipe 8 through pipes. The shell 1 is in a shape that is convenient for a user to hold with a single hand.

By the above design, the insulating partition portion 5 can divide the chemical solution in the liquid storage cavity 2 into a charging cavity 6 and a chemical solution supply cavity 7, and the charging cavity 6 is not communicated with the chemical solution supply cavity 7, so that originally charging the whole liquid storage cavity 2 is changed into charging only the charging cavity 6. Thus, the charging range is reduced, and the quantity of electric charges in the chemical solution in the charging cavity 6 is increased. The pump 21 can directly pump the chemical solution from the charging cavity through the water pipe 8. The ground strap 9 is arranged on the shell 1 and connected to the second electrode 12, so it is convenient for grounding through the connection between a human body and the ground when it is held. When in use, a switch 23 is pushed down, the battery 4 supplies power to the electrostatic generator 10 and the pump 21, and the electrostatic generator 10 charges the charging cavity 6 in the liquid storage cavity 2 through the first electrode 11, so that the chemical solution in the charging cavity 6 is electrically charged. The pump 21 pumps the electrically charged chemical solution in the charging cavity 6 through the water pipe 8, and delivers the electrically charged chemical solution to the nozzle 22 through a pipe, so that the electrically charged chemical solution is sprayed from the nozzle 22. The sprayed object is grounded, and a loop is formed by using the human body and the ground strap 9, so that the electrically charged chemical solution is absorbed onto the sprayed object. After the electrically charged chemical solution in the charging cavity 6 is pumped out, the insulating partition portion 5 is opened, and the chemical solution in the chemical solution supply cavity 7 is supplied to the charging cavity 6 After the chemical solution in the charging cavity 6 has been supplied, the insulating partition portion 5 is closed to realize the insulation between the charging cavity 6 and the chemical solution supply cavity 7 and prevent charges from entering the chemical solution in the chemical solution supply cavity 7, so that the quantity of electric charges in the chemical solution in the charging cavity 6 is increased.

In this embodiment, the "electrostatic output electrode" in the above-described method is the first electrode 11, and the second electrode 12 is a connection electrode of the ground output terminal on the electrostatic generator 10. In this embodiment, the electrostatic generator is an electrostatic module having a model number of 1000 V in the commercially-available products, and the liquid storage cavity 2 has a volume of 2 L. In this embodiment, charging cavities in 100 ml, 200 ml, 300 ml, 400 ml and 500 ml were separated from the liquid storage cavity 2 respectively and then filled with the chemical solution, and the chemical solution in these charging cavities and 2 L of the chemical solution that was not isolated were charged for comparison. The charging amount was compared by using the amount of the chemical solution absorbed by the sprayed object. The sprayed object was a hollow metal net ball having a mesh density of 100, and a water absorbing material was arranged in the hollow body of the hollow metal net ball. Six hollow metal net balls provided with the water absorbing material were suspended on the suspended weighing scales, and each hollow metal net ball provided with the water absorbing material has an initial weight of 250 g and is communicated with the grounding wire. The distance from the nozzle of each electrostatic sprayer having a charging cavity with a different capacity to the center of the hollow metal net ball was 20 cm, and the chemical solution in the charging cavity 6 was charged for 5 minutes and then sprayed. The improvement of the absorption effect was proved by using the amount of the chemical solution absorbed by the hollow metal net ball after spraying. After tests, the results are shown in the following table:

| Capacity of the charging cavity | 2000 ml | 500 ml | 400 ml | 300 ml | 200 ml | 100 ml |
|---|---|---|---|---|---|---|
| Initial weight of the metal ball | 250 g | 250 g | 250 g | 250 g | 250 g | 250 g |

-continued

| | | | | | | |
|---|---|---|---|---|---|---|
| Weight after absorbing the chemical solution | 302.2 g | 320.2 g | 324.5 g | 332.1 g | 339.2 g | 342.6 g |
| The decrease of the chemical solution in the liquid storage cavity | 100 g | 100 g | 100 g | 100 g | 100 g | 100 g |
| Observing the flow of the sprayed chemical solution to the surface of the metal net ball | The sprayed chemical solution only flows to the front face, i.e., a face that can be sprayed, of the metal net ball | The sprayed chemical solution flows to the front face and side face of the metal net ball | The sprayed chemical solution flows to the front face, side face and less rear face of the metal net ball | The sprayed chemical solution flows to the front face, side face and rear face of the metal net ball | The sprayed chemical solution flows to the front face, side face and rear face of the metal net ball | The sprayed chemical solution quickly flows across the whole surface of the metal net ball |

It can be known from the detection that, if the chemical solution is charged by an electrostatic module with the same power, the concentration of charges in the chemical solution can be increased by decreasing the amount of the electrically charged chemical solution, so that the absorption amount of the chemical solution is increased. In this embodiment, when 100 ml of the chemical solution was charged by a 1000 V commercially-available electrostatic module, in the case of 20 cm away from the sprayed object, the absorption rate of the chemical solution reached 92.6%; however, the absorption rate of the chemical solution was only 52.2% in the case where 2 L of the chemical solution was charged.

It can be known from the implementation data that, by insulated dividing the original liquid storage cavity that is to be charged as a whole into a charging cavity for applying charges and a chemical solution supply cavity for supplying the chemical solution, the amount of the chemical solution to be charged in unit time in the charging cavity is decreased, and the quantity of electric charges of the chemical solution in the charging cavity is increased, so that the absorption effect of the electrically charged chemical solution after sprayed is improved and the bactericidal effect of the chemical solution is improved. Moreover, after the chemical solution in the charging cavity has been used, the chemical solution can be supplied from the chemical solution supply cavity, and the total amount of the carried chemical solution remains unchanged. Thus, without changing the total amount of the chemical solution, the quantity of electric charges in the chemical solution for spraying is increased, the quantity of electric charges in the sprayed chemical solution is thus increased, and the absorption effect is greatly improved.

Embodiment 2

Figure 2:
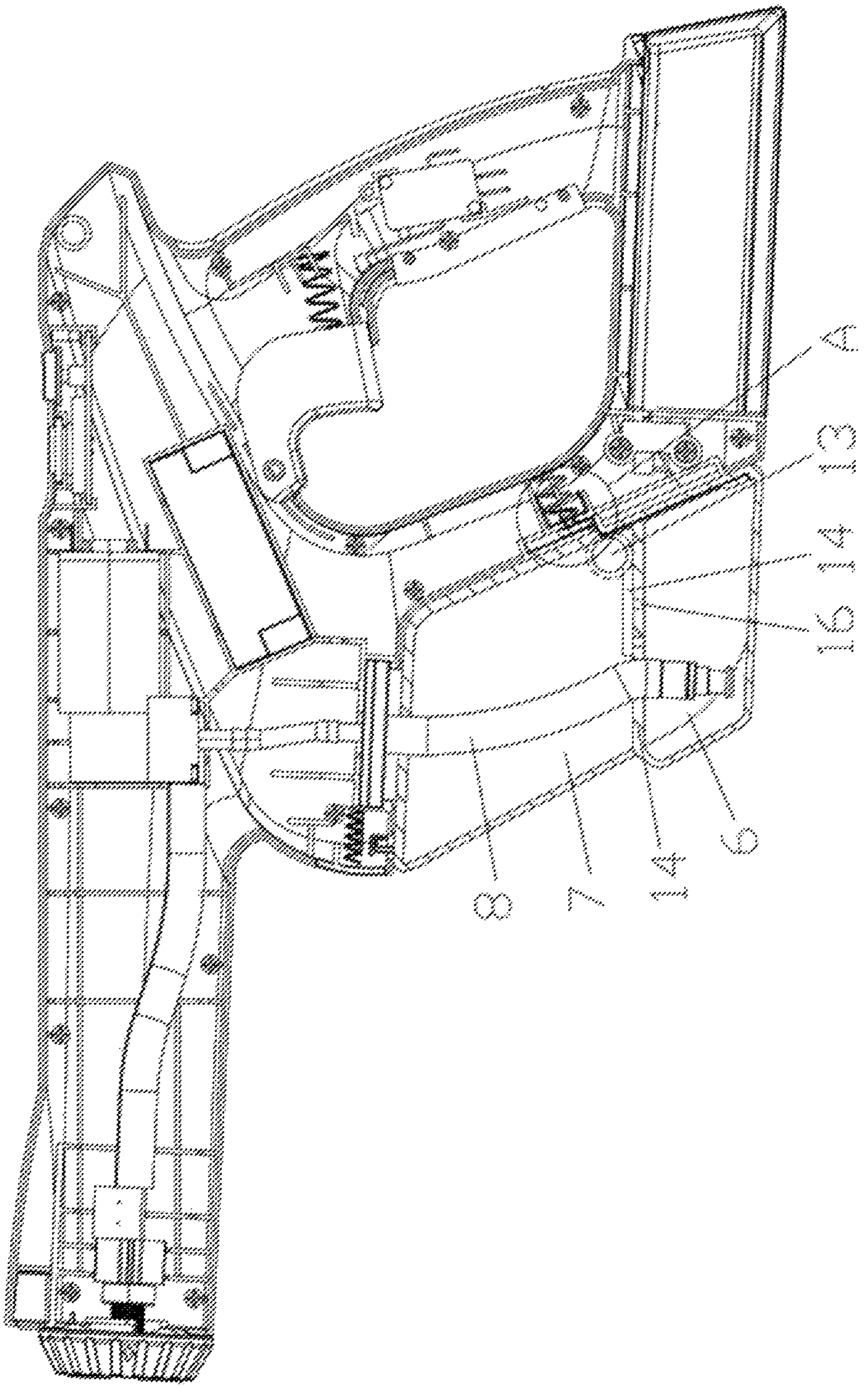
FIG. 2 is a schematic structure diagram of Embodiment 3 of the present invention.
Figure 3:
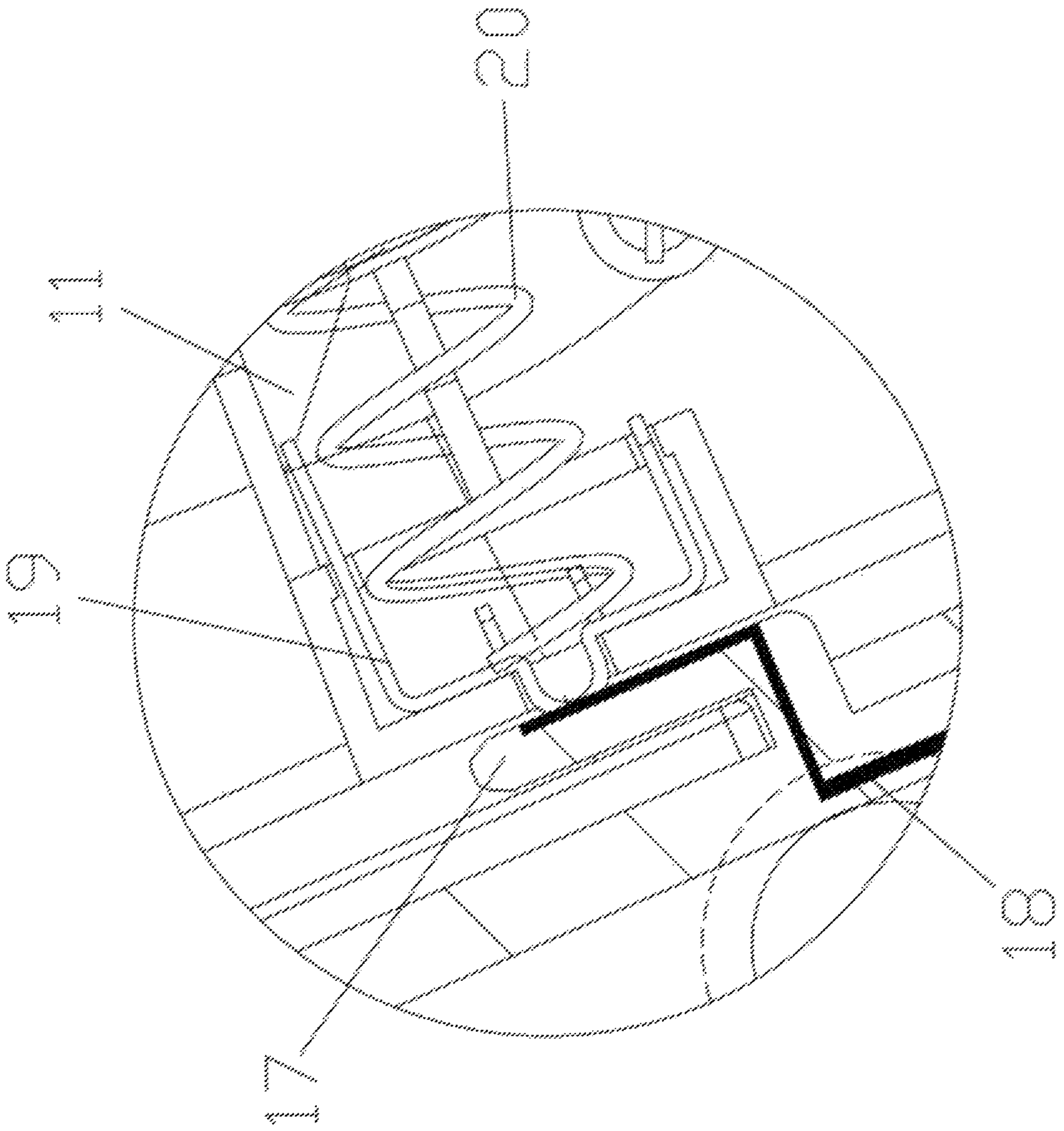
FIG. 3 is an enlarged view of part A in FIG. 2.
Figure 4:
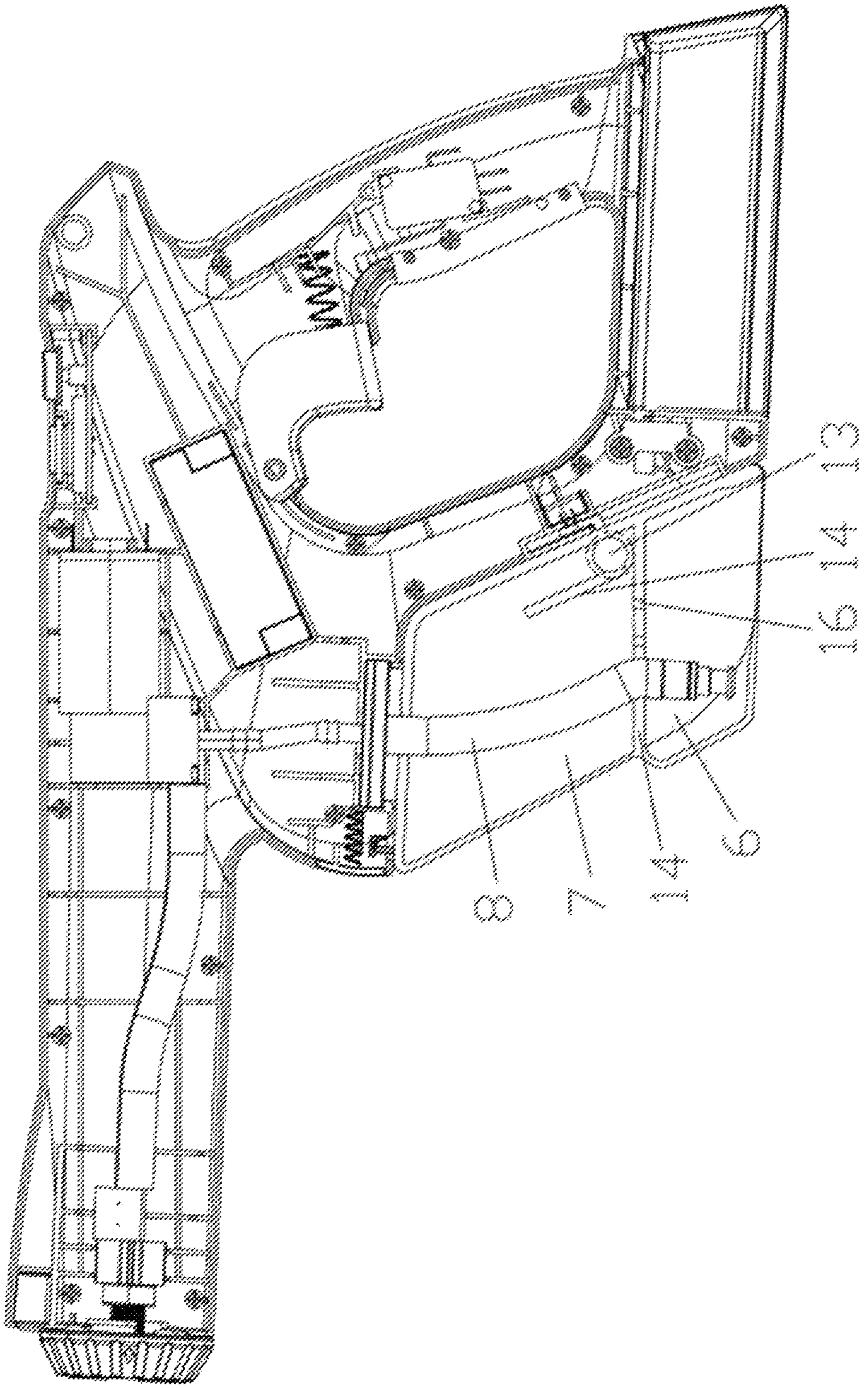
FIG. 4 is a schematic diagram of a baffle when opened according to Embodiment 3 of the present invention.

This embodiment provides a device for increasing the quantity of electric charges in a chemical solution of an electrostatic sprayer. To facilitate the chemical solution in the chemical solution supply cavity 7 to enter the charging cavity 6, as shown in FIGS. 2-4, in addition to the features described in Embodiment 1, the insulating partition portion 5 includes a knob 13, a liquid filter plate 14 and a baffle 15. The knob 13 is arranged on the liquid storage cavity 2. Liquid filter holes 16 are formed on the liquid filter plate 14. The baffle 15 is arranged on one side of the liquid filter plate 14 and adhered to the liquid filter plate 14. One end of the baffle 15 is connected to the knob 13.

To make the connection between the first electrode 11 and the charging cavity 6 more reliable, a buckle 17 fixed to the shell 1 was arranged on the liquid storage cavity 2; a conductive piece 18 was arranged in the buckle 17; the conductive piece 18 was connected to the charging cavity 6 in the liquid storage cavity 2; a contact piece 19 in contact with the conductive piece 18 was arranged on the shell 1; and, the contact piece 19 was connected to the first electrode 11.

To make the contact between the conductive piece 18 and the contact piece 19 firmer, a spring 20 was arranged in rear of the contact piece 19.

By the above design, the knob 13 was convenient to rotate the baffle 15, and it was convenient for the baffle 15 to open or close the liquid filter holes 16 on the liquid filter plate 14. When in use, the knob 13 was rotated to move the baffle 15 away from the liquid filter plate 14, so that the liquid filter holes 16 were not blocked by the baffle 15, and the chemical solution can flow from the chemical solution supply cavity 7 to the charging cavity 6 through the liquid filter holes 16. Moreover, large particle impurities can be removed from the chemical solution when passing through the liquid filter holes 16, thereby avoiding pipe blockage. A conductive piece 18 was arranged in the buckle 17 of the liquid storage cavity 2, a contact piece 19 connected to the first electrode 11 was arranged in the shell 1, and the contact piece 18 comes into contact with the contact piece 19 after the liquid storage cavity 2 was fixed, so that the first electrode 11 was communicated with the charging cavity 6 in the liquid storage cavity 2. After the liquid storage cavity 2 was detached, the conductive piece 18 was separated from the contact piece 19, and the first electrode 11 was not communicated with the charging cavity 6 in the liquid storage cavity 2. A spring 20 was arranged in rear of the contact piece 19, so the spring 20 can realize closer contact between the contact piece 19 and the conductive piece 18, so that the fixation becomes firmer.

The foregoing description merely shows the preferred embodiments of the present invention and is not intended to limit the present invention in any form. Although the present has been disclosed by the preferred embodiments, the preferred embodiments are not intended to limit the present invention. Any person of ordinary skill in the art can make some change or modifications to the technical contents disclosed above to form equivalent embodiments with equivalent changes, without departing from the scope of the technical solutions of the present invention. Any simple alterations, equivalent changes and modifications made to the foregoing embodiments according to the technical essence of the present invention without departing from the technical solutions of the present invention shall fall into the scope of the technical solutions of the present invention.

The invention claimed is:

1. A method for increasing the quantity of electric charges in a chemical solution of an electrostatic sprayer, which uses a liquid storage cavity of the electrostatic sprayer and an electrostatic module for generating static electricity, comprising the steps of:

dividing the liquid storage cavity into a charging cavity and a chemical solution supply cavity;

isolating the charging cavity from the chemical solution supply cavity;

an electrostatic output electrode of the electrostatic module applying static electricity to a chemical solution in the charging cavity in a static state so that the chemical solution carries a high content of electric charges;

after the chemical solution carried with a high content of electric charges being sprayed out, supplying the chemical solution in the chemical solution supply cavity into the charging cavity, so that the sprayed chemical solution is allowed to carry a high content of electric charges by charging static electricity to a small amount of the chemical solution in a stepped manner, thereby improving the absorption effect of the chemical solution on a sprayed object.

2. A device for increasing the quantity of electric charges in a chemical solution of an electrostatic sprayer, comprising a shell (1), a liquid storage cavity (2), an electrostatic module (3) and a battery (4), wherein an insulating partition portion (5) is arranged in the liquid storage cavity (2); the insulating partition portion (5) divides the liquid storage cavity into a charging cavity (6) and a chemical solution supply solution (7); a water pipe (8) and a ground strap (9) are arranged on the shell (1); the water pipe (8) is connected to the charging cavity (6) in the liquid storage cavity (2); the electrostatic module (3) is arranged in the shell (1); the electrostatic module (3) comprises an electrostatic generator (10), a first electrode (11) and a second electrode (12); the first electrode (11) is connected to the charging cavity (6) in the liquid storage cavity (2); the second electrode (12) is connected to the ground strap (9); and, the battery (4) is connected to the electrostatic generator (10).

3. The device for increasing the quantity of electric charges in a chemical solution of an electrostatic sprayer according to claim 2, wherein the insulating partition portion (5) comprises a knob (13), a liquid filter plate (14) and a baffle (15); the knob (13) is arranged on the liquid storage cavity (2); liquid filter holes (16) are formed on the liquid filter plate (14); the baffle (15) is arranged on one side of the liquid filter plate (14) and attached to the liquid filter plate (14); and, one end of the baffle (15) is connected to the knob (13).

4. The device for increasing the quantity of electric charges in a chemical solution of an electrostatic sprayer according to claim 3, wherein a buckle (17) fixed to the shell (1) is arranged on the liquid storage cavity (2); a conductive piece (18) is arranged in the buckle (17); the conductive piece (18) is connected to the charging cavity (6) in the liquid storage cavity (2); a contact piece (19) in contact with the conductive piece (18) is arranged on the shell (1); and, the contact piece (9) is connected to the first electrode (11).

5. The device for increasing the quantity of electric charges in a chemical solution of an electrostatic sprayer according to claim 4, wherein a spring (20) is arranged in rear of the contact piece (19).

* * * * *